(12) United States Patent
Goddert et al.

(10) Patent No.: US 10,300,864 B2
(45) Date of Patent: May 28, 2019

(54) SYSTEM FOR MOUNTING ON THE SURFACE OF THE BODY OF A VEHICLE (71) Applicant: EasyStrap Inc., Menlo Park, CA (US)

(72) Inventors: Bryan Goddert, Dragor (DK); Michael Thiesen, Vienna (AT)

(73) Assignee: EASYSTRAP INC., Menlo Park, CA (US)

(*) Notice: Subject to any disclaimer, the term of this patent is extended or adjusted under 35 U.S.C. 154(b) by 52 days.

(21) Appl. No.: 15/037,294

(22) PCT Filed: Nov. 13, 2014

(86) PCT No.: PCT/DK2014/000054
§ 371 (c)(1),
(2) Date: May 17, 2016

(87) PCT Pub. No.: WO2015/070868
PCT Pub. Date: May 21, 2015

(65) Prior Publication Data
US 2016/0272124 A1 Sep. 22, 2016

(30) Foreign Application Priority Data
Nov. 18, 2013 (DK) .................................. 2013 70693

(51) Int. Cl.
*B60R 9/058* (2006.01)
*B60R 9/04* (2006.01)
*F16B 47/00* (2006.01)

(52) U.S. Cl.
CPC ............... *B60R 9/058* (2013.01); *B60R 9/04* (2013.01); *F16B 47/006* (2013.01)

(58) Field of Classification Search
CPC ..... B60R 2011/0056; B60R 2011/0068; B60R 9/04; B60R 9/048; B60R 9/058; F16B 47/006
(Continued)

(56) References Cited

U.S. PATENT DOCUMENTS 3,904,164 A * 9/1975 Wheeler .................. B60R 9/058
248/362
4,218,036 A * 8/1980 Pitkanen ............... B60R 1/0617
248/478
(Continued)

FOREIGN PATENT DOCUMENTS

DE 202010005517 U1 9/2010
DE 202013102899 U1 7/2013
(Continued)

Primary Examiner — Scott T McNurlen
(74) Attorney, Agent, or Firm — Leason Ellis LLP (57) ABSTRACT This invention relates to a device mounted on the surface of a vehicle for securing one or more items to the vehicle. The device includes an upper housing made of relatively hard material and a bottom part made of flexible, relatively soft material having a bottom surface and a top surface. The bottom part is capable of shifting its configuration between a disengaged configuration, wherein the bottom surface of the bottom part is essentially planar, and an engaged configuration, wherein the bottom surface of the bottom part is concave. An upper housing includes an actuator means for actuating the bottom part to shift the configuration of the bottom part between the disengaged and the engaged configurations. The actuator means keeps the bottom part in the engaged configuration until being disengaged. The upper housing includes one or more holes for securing one or more items to the vehicle.

11 Claims, 6 Drawing Sheets (58) Field of Classification Search
USPC ........ 224/545, 555, 547, 557–562, 564–565,
224/567–572, 42.32, 42.33, 42.38, 42.39,
224/42.4, 309–317, 319–326;
403/315–319, 290
See application file for complete search history.

(56) References Cited

U.S. PATENT DOCUMENTS

| | | | |
|---|---|---|---|
| 4,601,419 A | 7/1986 | Bird | |
| 4,694,544 A * | 9/1987 | Chapman | .............. F16B 21/065 |
| | | | 24/625 |
| 5,423,466 A * | 6/1995 | Moon | ..................... B60R 9/058 |
| | | | 224/309 |
| 5,454,540 A | 10/1995 | McPherson et al. | |
| 6,045,111 A | 4/2000 | Hsieh | |
| 6,059,010 A | 5/2000 | Yang | |
| 6,908,138 B2 * | 6/2005 | Yang | ..................... B60J 11/025 |
| | | | 135/88.1 |
| 2001/0042766 A1 * | 11/2001 | Ming-Shun | ............. B60R 9/058 |
| | | | 224/324 |
| 2008/0061199 A1 * | 3/2008 | Chen | ....................... B60R 11/00 |
| | | | 248/205.8 |
| 2009/0224117 A1 * | 9/2009 | Kaneda | ................... F16B 47/00 |
| | | | 248/206.3 |
| 2009/0267375 A1 * | 10/2009 | Vander Sluis | ....... B60N 2/4673 |
| | | | 296/37.8 |
| 2010/0320341 A1 * | 12/2010 | Baumann | ............ B60R 11/0241 |
| | | | 248/206.2 |
| 2012/0168481 A1 * | 7/2012 | Casagrande | .............. B60R 9/08 |
| | | | 224/556 |

FOREIGN PATENT DOCUMENTS

| | | |
|---|---|---|
| EP | 2138354 A2 | 12/2009 |
| EP | 2302235 A | 3/2011 |
| EP | 2693064 A1 | 2/2014 |
| GB | 2426784 A | 12/2006 |
| WO | 2008008742 A1 | 1/2008 |

* cited by examiner

SYSTEM FOR MOUNTING ON THE SURFACE OF THE BODY OF A VEHICLE

CROSS REFERENCE TO RELATED APPLICATIONS

This United States application is the National Phase of PCT Application No. PCT/DK/2014/000054 filed 13 Nov. 2014 which claims priority to Denmark Application No. PA 2013 70693 filed 18 Nov. 2013, each of which are incorporated herein by reference.

FIELD OF THE INVENTION

The present invention relates in a first aspect to a system for mounting on the surface of the body of a vehicle for securing one or more items to a vehicle. In a second aspect, the present invention relates to the use of a system according to the first aspect. In a third aspect, the present invention relates to a method of securing goods on or in a vehicle.

BACKGROUND OF THE INVENTION

Within the field of transportation of goods in smaller vehicles, such as family cars it has been known for many years to provide a vehicle with a carrying rack which enables fastening larger items or goods on the top of the vehicle, thus allowing transportation of goods which in itself is too large to accommodate in the cabin of the car. Such a carrying rack may comprise a set of two rails which are adapted to be mounted in the drip moulding of the car. Alternatively, such a rack may comprise a frame extending in a width approximately corresponding to the width of the roof of the vehicle, and extending in a longitudinal direction corresponding to approximately the length of the roof of the vehicle.

These two types of prior art roof racks for vehicles are taking up quite a lot of space. For this reason these roof racks are not suitable for accommodating inside a vehicle when not in use. Also, in case the driver decides to have such a prior art roof rack more or less permanently fixed to the roof of the vehicle, i.e. also when not using the rack for transporting goods, the driver will be encountering a considerably lower petrol mileage due to the increased air resistance imposed on the vehicle by the roof rack.

Furthermore, the mounting of these prior art roof racks is a cumbersome and time consuming process which in many cases is very difficult to perform singlehanded.

EP 2 302 235 A1 discloses a vacuum suction device. The device comprises a support shell and an associated flexible suction cup as well as an actuating mechanism which upon actuation acts on the suction cup in order to produce a vacuum between the suction cup and a surface facing the suction cup. The actuation of the actuation mechanism provides changing of the suction cup via a coupling mechanism from an engaged configuration providing a vacuum and a disengaged configuration providing no vacuum. Furthermore, the device comprises means which may provide a partial vacuum beneath the suction cup. The device is primarily for use as a lifting device or for use as a handle for example in a bathroom.

EP 2 302 235 A1 does not disclose that the device comprises any fastening means for the purpose of tethering items to the device.

Accordingly, a smaller, more flexibly usable type of roof rack for a vehicle is needed.

It is the object of the present invention to provide a system comprising a smaller and usably more flexible type of a roof rack for a vehicle.

BRIEF DESCRIPTION OF THE INVENTION

The object of the present invention may be achieved by a system having the features defined in claim 1, by the use as defined in claim 15 and finally by the method as defined in claim 16. Preferred embodiments are defined in the dependent claims and explained in the following description and illustrated in the accompanying drawings.

Accordingly, in a first aspect, the present invention relates to a system comprising one or more devices and one or more brackets, wherein each said device is for mounting on the surface of the body of a vehicle for securing one or more items to a vehicle; said device in the orientation intended for use comprising:
  an upper housing made of a relatively hard material;
  a bottom part made of a flexible, relatively soft material, said flexible, relatively soft material comprising a bottom surface and a top surface;
  wherein said bottom part being configured to be able to shift its configuration between a disengaged configuration, in which the bottom surface of the bottom part is essentially planar, and an engaged configuration, in which the bottom surface of the bottom part is concave;
  wherein said upper housing comprises actuator means for actuating the bottom part in order to shift the configuration of the bottom part between said disengaged configuration and said engaged configuration;
  wherein said actuator means being configured to keep said bottom part in said engaged configuration, until being disengaged into a disengaged configuration;
  wherein the upper housing comprises one or more through going holes for providing means for securing one or more items to a vehicle;
  The system is characterized in that said one or more brackets comprising attachment means configured to be releasable attached to the one or more of said through going holes in the upper housing of said device; and wherein said one or more brackets comprising an elongate rail; and wherein said attachment means is/are arranged at an end of said rail or at a middle part of said rail.

In a second aspect the present invention relates to a use of a system according to the first aspect of the present invention for securing one or more items to a vehicle.

In a third aspect the present invention relates to a method of securing goods to a vehicle, said method comprising:
  i) providing one or more systems according to the first aspect of the present invention;
  ii) ensuring that said actuator means for actuating the bottom part of said one or more devices is having a disengaged configuration;
  iii) bringing said bottom part of said one or more devices into contact with the surface of a body of a vehicle;
  iv) pressing said bottom part of said one or more devices against said surface of said body of a vehicle;
  v) shifting said actuator means of said one or more devices from said disengaged configuration into an engaged configuration, thereby also shifting said bottom part from a disengaged configuration into an engaged configuration; thus allowing said one or more devices to be fastened by suction to said surface of said body of a vehicle;
  vi) tethering one or more items arranged at the body of the vehicle to one or more of said devices.

The invention according to the first, the second, and the third aspect provides for a smaller and more useable and flexible means for securing items to a vehicle.

Furthermore, the invention is advantageous as a supplementary fixation point for goods being transported on a prior art roof rack in that the device according to the first aspect of the present invention may be fixed on the surface of a body of a vehicle, and subsequently a line or rope may be tethered between the hole of the device and the goods to be transported.

Still further, the invention implies the advantages that, in contrast to the prior art roof racks, it can be easily and fast mounted on and dismounted from a surface of a vehicle, even if performed singlehanded.

Accordingly, the system of the invention allows building up on the surface of the body of a vehicle a rack-like system which better allows for attachment of goods and/or items.

BRIEF DESCRIPTION OF THE FIGURES

FIG. 6b shows a close-up of the attachment means of the bracket of the system shown in FIG. 6a.

DETAILED DESCRIPTION OF THE INVENTION

The First Aspect of the Present Invention

In a first aspect, the present invention relates to a system comprising one or more devices and one or more brackets, wherein each said device is for mounting on the surface of the body of a vehicle for securing one or more items to a vehicle; said device in the orientation intended for use comprising:
  an upper housing made of a relatively hard material;
  a bottom part made of a flexible, relatively soft material, said flexible, relatively soft material comprising a bottom surface and a top surface;
  wherein said bottom part being configured to be able to shift its configuration between a disengaged configuration, in which the bottom surface of the bottom part is essentially planar, and an engaged configuration, in which the bottom surface of the bottom part is concave;
  wherein said upper housing comprises actuator means for actuating the bottom part in order to shift the configuration of the bottom part between said disengaged configuration and said engaged configuration;
  wherein said actuator means being configured to keep said bottom part in said engaged configuration, until being disengaged into a disengaged configuration;
  wherein the upper housing comprises one or more through going holes for providing means for securing one or more items to a vehicle.

The system is characterized in that said one or more brackets comprising attachment means configured to be releasable attached to the one or more of said through going holes in the upper housing of said device; and wherein said one or more brackets comprising an elongate rail; and wherein said attachment means is/are arranged at an end of said rail or at a middle part of said rail.

The system may be suitable for fixing onto any smooth, relatively planar surface. In the present invention the device is disclosed with special attention to the use on the surface of a body of a vehicle, such as a car.

The device of the system comprises an upper housing made of a relatively hard material and a bottom part made of a flexible, relatively soft material.

In the present description and the appended claims the terms "relatively hard" and "relatively soft" shall be understood to mean that the upper housing is made of a material that is harder than the flexible material of the bottom part.

In the present description, the term "in the orientation intended for use" shall be understood to mean in an orientation in which the device of the system is fastened upon the roof of a vehicle and in which the upper housing in oriented above the bottom part of a flexible, relatively soft material. However, the term "in the orientation intended for use" shall within the meaning defined above not in any way exclude the use or suitability of arranging the device in any other orientation.

The soft material is configured to change curvature, by actuation thereof, from a disengaged configuration, in which a bottom surface of the bottom part is essentially planar, to an engaged configuration, in which the bottom surface of the bottom part is concave. Such activation will allow the device of the system to be sucked and fixed onto a smooth and relatively planer surface, such as the surface of the body of a vehicle.

The upper housing of the device of the system comprises one or more through going holes for providing means for securing one or more items to said vehicle. Accordingly, once being sucked to a smooth and relatively planer surface, goods and/or items may be fastened to the one or more through-going holes of the device.

In one embodiment of the first aspect of the present invention, the bottom part of a flexible, relatively soft material of the device of the system is having a circular or essentially circular circumference.

Such a geometry of the bottom part will better allow the bottom part to attain a concave configuration.

In one embodiment of the first aspect of the present invention, the surface area of the bottom surface of the bottom part of a flexible, relatively soft material of the device of the system is 75-700 $cm^2$, such as 100-675 $cm^2$, for example 125-650 $cm^2$, e.g. 150-625 $cm^2$, for example 175-600 $cm^2$, such as 200-575 $cm^2$, e.g. 225-550 $cm^2$, such as 250-525 $cm^2$, e.g. 275-500 $cm^2$, for example 300-475 $cm^2$, such as 325-450 $cm^2$, e.g. 350-425 $cm^2$, such as 375-400 $cm^2$.

These surface areas have proven to be a good compromise between as little as possible size and as good as possible suction power.

In one embodiment of the first aspect of the present invention, the upper housing of the device of the system is made of a polymer or polymer composite material, such as nylon or nylon-based material, i.e. nylon mixed with other material(s).

In one embodiment of the first aspect of the present invention, the bottom part of the device of the system, is made of a flexible, relatively soft material is made of a polymer, such as rubber or a plastic.

These materials have proven extremely well-suited due to their strength and production costs.

In one embodiment of the first aspect of the present invention, the actuator means of the device of the system comprises a lever having a first end and a second end, wherein said lever at a position near its first end being pivotally mounted in said upper housing, wherein said lever, preferable near its first end, being mechanically connected to an actuation rod extending downwardly and being mechanically connected to the bottom part of said device, said actuation rod preferably being connected to a central part of bottom part of said device of said system.

This design provides for a mechanically strong actuator which at the same time is easy to handle upon engaging and disengaging the bottom part of the device.

In one embodiment of the first aspect of the present invention, the flexible, relatively soft material of the bottom part of the device of the system, in its interior comprises a relative stiff sheet material; and wherein said actuation rod being mechanically connected to said relative stiff sheet material.

This embodiment provides for a strong attachment of the actuation rod to the bottom part.

In one embodiment of the first aspect of the present invention, the device of the system comprising a lock for locking against theft of said actuator, said lock being configured to lock said actuator means in its engaged configuration, in which the bottom surface of the bottom part is concave; and wherein said lock optionally also being configured to allow locking of said actuator means in its disengaged configuration, in which the bottom surface of the bottom part is essentially planar.

Locks make it possible to leave a vehicle with one or more devices attached to the body in an engaged configuration without the risk of theft.

In one embodiment of the first aspect of the present invention, the one or more through going holes provided in the upper housing of the device of the system is having a cross-sectional area of 1-30 $cm^2$, such as 2-28 $cm^2$, e.g. 4-26 $cm^2$, such as 6-24 $cm^2$, for example 8-22 $cm^2$, e.g. 10-20 $cm^2$, such as 12-18 $cm^2$ or 14-16 $cm^2$.

Such cross-sectional areas of the one or more through going holes provided in the upper housing provide easy access when attaching a tethering or a line or the like to the one or more through going holes.

In one embodiment of the first aspect of the present invention, the lever of the device of the system is being spring loaded by a spring.

Spring loading the lever may imply that a user upon engaging applies more pressure to the device and thus provides better contact between the lower surface of the bottom part and the surface upon which the devise is intended to be attached.

In one embodiment of the first aspect of the present invention, the attachment means comprises a snap on lock for being releasable attached to said one or more through going holes in said upper part of said device of said system.

A snap lock allows for fast and easy attachment of a bracket to a device.

In one embodiment of the first aspect of the present invention, the system comprises a separate fixation part for fixation of the bracket, said device being configured to receive said fixation part from the opposite side of the through going hole, compared to the side from which the bracket is received.

The fixation part serves the purpose of locking the bracket so that it does not loosen accidentally.

In one embodiment of the first aspect of the present invention, the one or more brackets comprising an elongate rail; and wherein said attachment means is/are arranged at an end of said rail or at a middle part of said rail.

A system comprising an elongate rail better allows for attachment of goods and/or items.

In one embodiment of the first aspect of the present invention, the system comprises two or more brackets.

Two or more brackets better allows for attachment of goods and/or items.

In one embodiment of the first aspect of the present invention, the rail is a telescopic rail being adapted to shift its configuration between an extracted configuration and a contracted configuration.

A telescopic rail allows for minimizing the space necessary to store the system when not in use. Hence, when the system comprises telescopic rail(s), the user may easily find storage space for the system inside the vehicle, when not in use for tethering goods or items.

The Second Aspect of the Present Invention

In a second aspect, the present invention relates to the use of a system according to the first aspect for securing one or more items to a vehicle.

The Third Aspect of the Present Invention

In a third aspect, the present invention relates to a method of securing goods to a vehicle, said method comprising:
 i) one or more systems according to the first aspect;
 ii) ensuring that said actuator means for actuating the bottom part of said one or more devices is having a disengaged configuration;
 iii) bringing said bottom part of said one or more devices into contact with the surface of a body of a vehicle;
 iv) pressing said bottom part of said one or more devices against said surface of said body of a vehicle;
 v) shifting said actuator means of said one or more devices from said disengaged configuration into an engaged configuration, thereby also shifting said bottom part from a disengaged configuration into an engaged configuration; thus allowing said one or more devices to be fastened by suction to said surface of said body of a vehicle;
 vi) tethering one or more items arranged at the body of the vehicle to one or more of said devices.

In one embodiment of the third aspect of the present invention one or more systems according to the first aspect of the invention is provided, in step i); and this step vi) said one or more items optionally being tethered to said bracket (s) or said rails of said system.

Figure 1A:
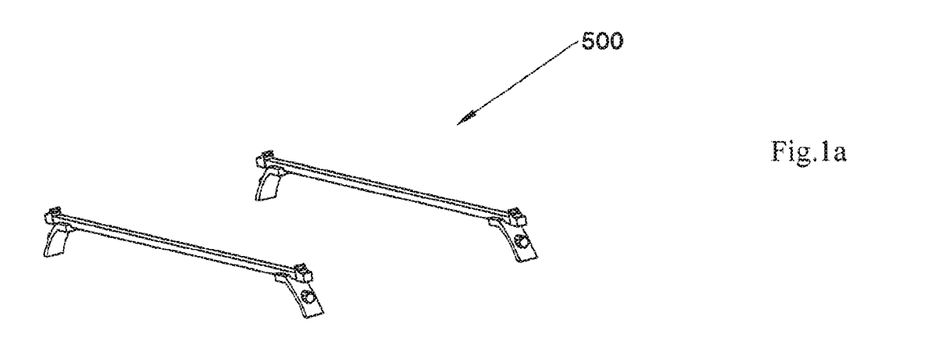
FIG. 1a shows in a perspective view one type of a prior art roof rack for a vehicle.
Figure 1B:
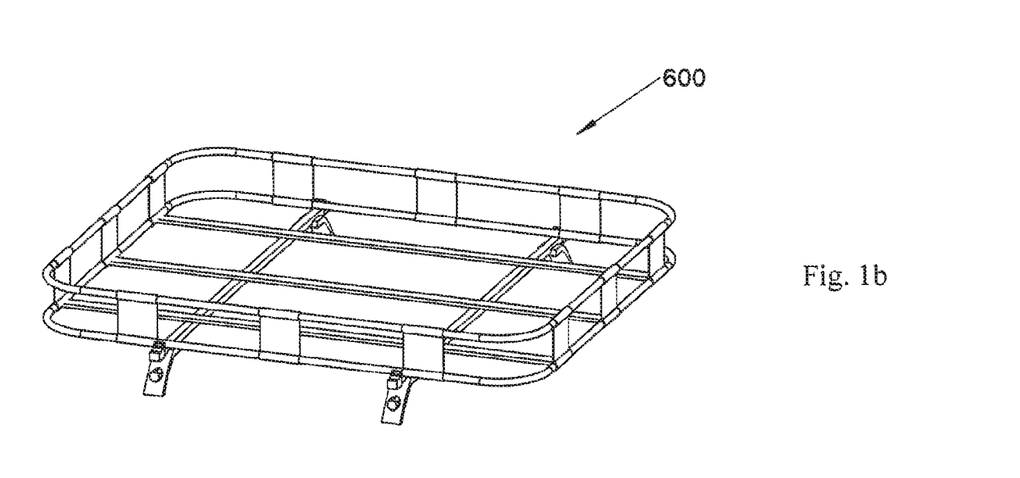
FIG. 1b shows in a perspective view another type of a prior art roof rack for a vehicle.

Referring now in detail to the drawings for the purpose of illustrating preferred embodiments of the present invention, two types of a prior art roof rack for a vehicle is illustrated in FIGS. 1a and 1b, respectively.

These prior art roof racks are intended to be suspended and fixed in the drip moulding on the side of the roof of the vehicle. Accordingly these prior art roof racks will have an extension in one direction corresponding essentially to the width of the vehicle. In case of the prior art roof rack depicted in FIG. 1b, the rack essentially has the same extension in a longitudinal and a transversal direction.

Due to these large extensions of these prior art roof rack, it will not be possible to accommodate the roof rack in the interior of a vehicle, at least not in case of a small vehicle, such as a compact car or a smaller family car. Furthermore, the mounting of such a prior art roof rack must for safety reason be performed carefully and this process is very time consuming and very difficult to accomplish single-handed.

Figure 2:
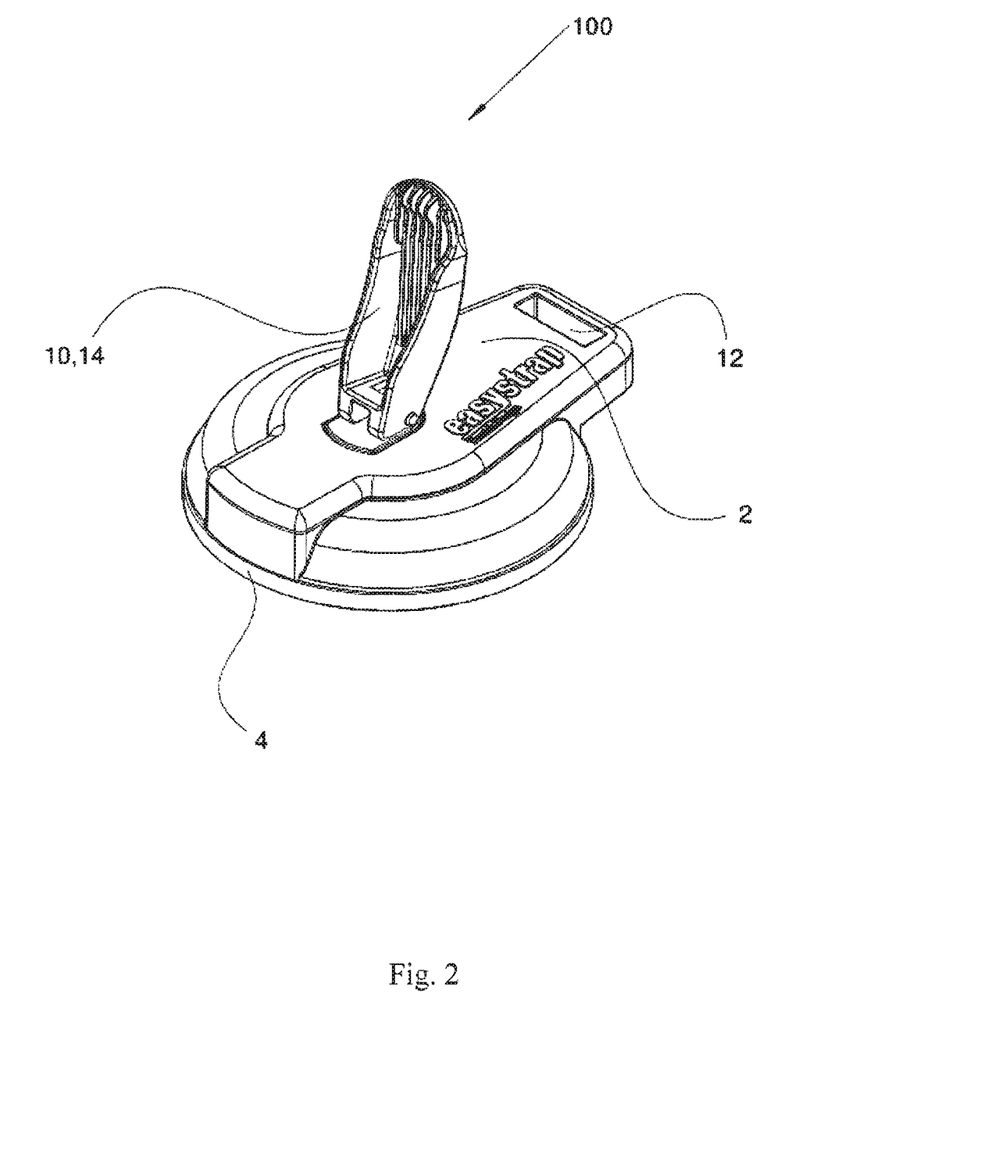
FIG. 2 shows in a perspective view one type of a device used in the system according to the first aspect of the present invention.

FIG. 2 shows in a perspective view a device 100 used according to the system of the first aspect of the present invention. The device is intended for mounting on the surface of the body of a vehicle for securing one or more items to said vehicle. As seen in FIG. 2, the device in the orientation intended for use comprising: an upper housing 2 and a bottom part 4. The upper housing 2 is made of a relatively hard material; and bottom part 4 is made of a flexible, relatively soft material.

The upper housing is provided with a thorough going hole for providing means for securing one or more items to said vehicle. 2, 3, 4, 5 or even more holes may also be provided.

FIG. 2 also shows that actuator means 10 in the form of a lever 14 is pivotally mounted on the upper housing 2 of the device 100. The lever is mechanically attached to the bottom part 4 of the flexible, relatively soft material in such a way that by activation of the lever, the bottom part may shift its configuration between a disengaged configuration, in which the bottom surface 6 of the bottom part 4 is essentially planar, and an engaged configuration, in which the bottom surface 6 of the bottom part 4 is concave.

Figure 3:
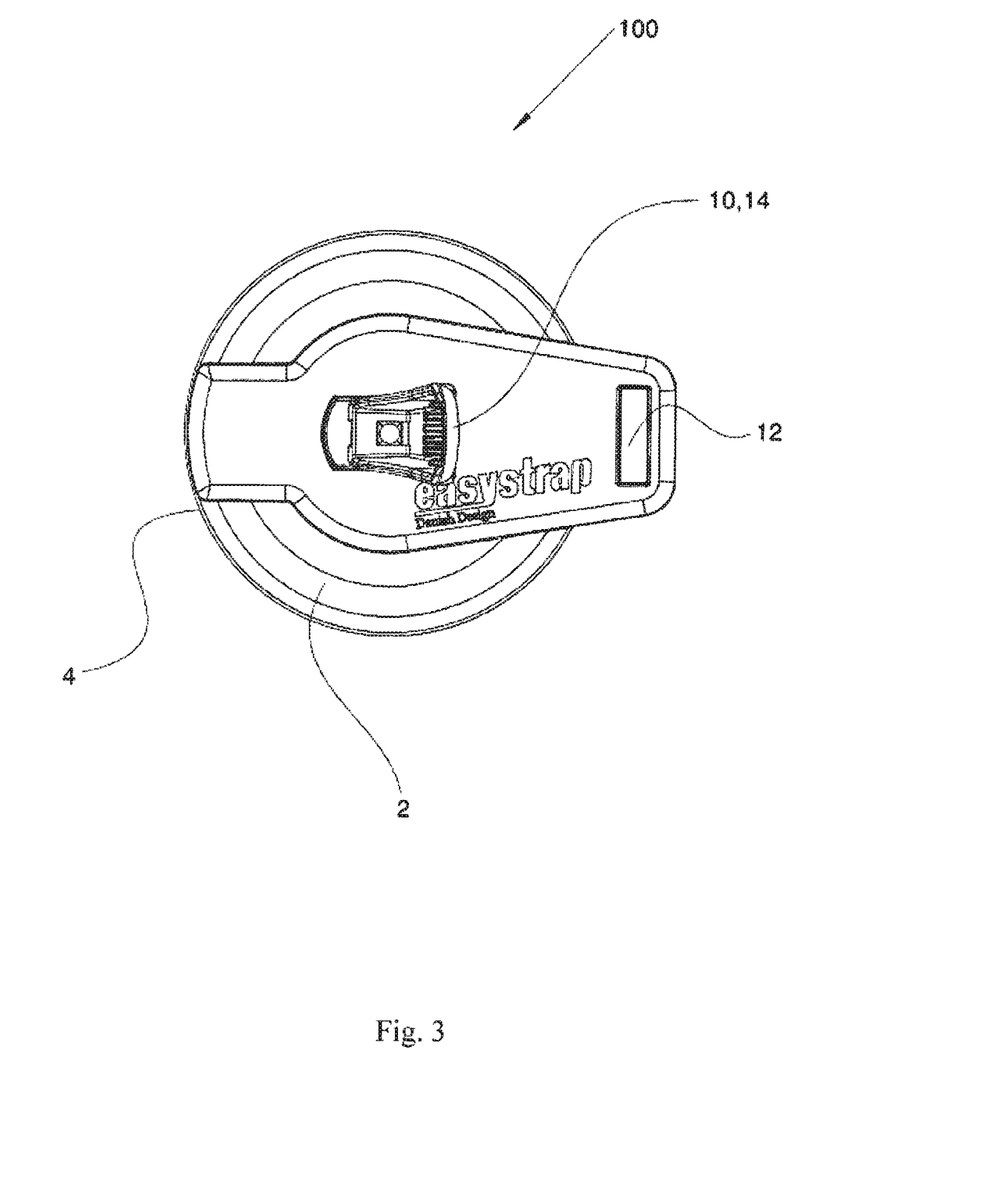
FIG. 3 shows in a plane view the device of FIG. 2.

FIG. 3 shows the device 100 of FIG. 2 as seen from above.

Figure 4:
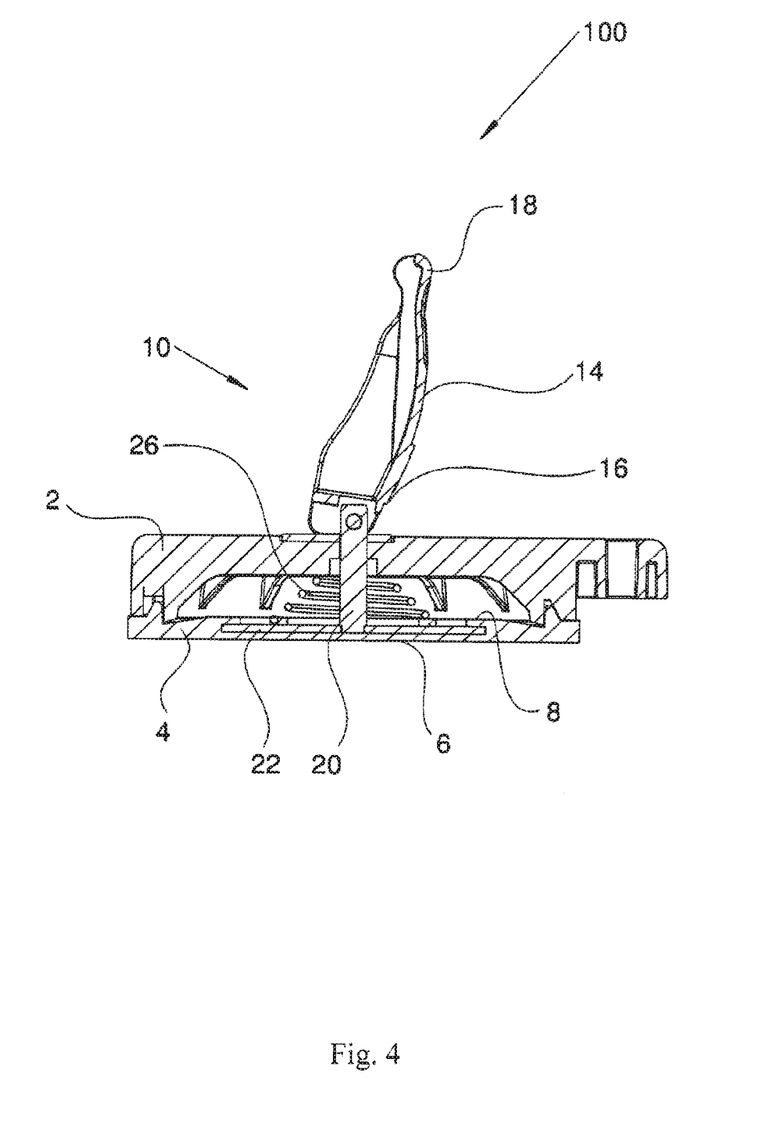
FIG. 4 shows in a cross-sectional view the device of FIG. 2.

The mechanism of the actuator means of the device of the system is shown in more detail in FIG. 4 which shows a cross-sectional view of the device of FIG. 2.

FIG. 4 shows the device 100 comprising the upper housing 2 and a bottom part 4 which comprises a bottom surface 6 and a top surface 8. The bottom part is made of a flexible, relatively soft material which is capable of switching its configuration between a disengaged configuration, in which the bottom surface 6 of the bottom part 4 is essentially planar, and an engaged configuration, in which the bottom surface 6 of the bottom part 4 is concave.

The bottom part 4 comprises in its interior a relatively rigid sheet material 22 which is mechanically connected to an actuation rod 20 which at its opposite end is connected to a first end 16 of a lever 14. The lever is pivotally mounted to the upper housing. A spring 26 for spring loading the bottom part is arranged between the top surface of the bottom part 4 and the first end of the lever.

In FIG. 4 the lever 14 is shown in its disengaged configuration in which the bottom part 4 of the flexible material is in a state in which its bottom surface is essentially planar. By engaging the lever 14 by moving the second end 18 of the lever 14 to the left, the actuation rod will be moved in an upward direction, which will result in a situation where the middle area of the bottom part will be lifted. This lift will cause the bottom surface 6 of the flexible bottom part 4 to attain a concave configuration.

In case the bottom surface, prior to being brought into an engaged configuration, is pressed against a smooth surface, such as the surface of the body of a vehicle, the lifting of the bottom part 4 will establish a vacuum between said surface of said vehicle and said bottom surface 6 of the bottom part 4. The established vacuum will ensure safe and long term fastening of the device 100 to the surface of the body of the vehicle.

Upon disengagement of the lever 14 by moving the lever to an upright position (as shown in FIG. 4), the previously established vacuum will be pressure equalized to the surrounding pressure. This means that the device 100 can be removed from the surface of the body of the vehicle.

Figure 5:
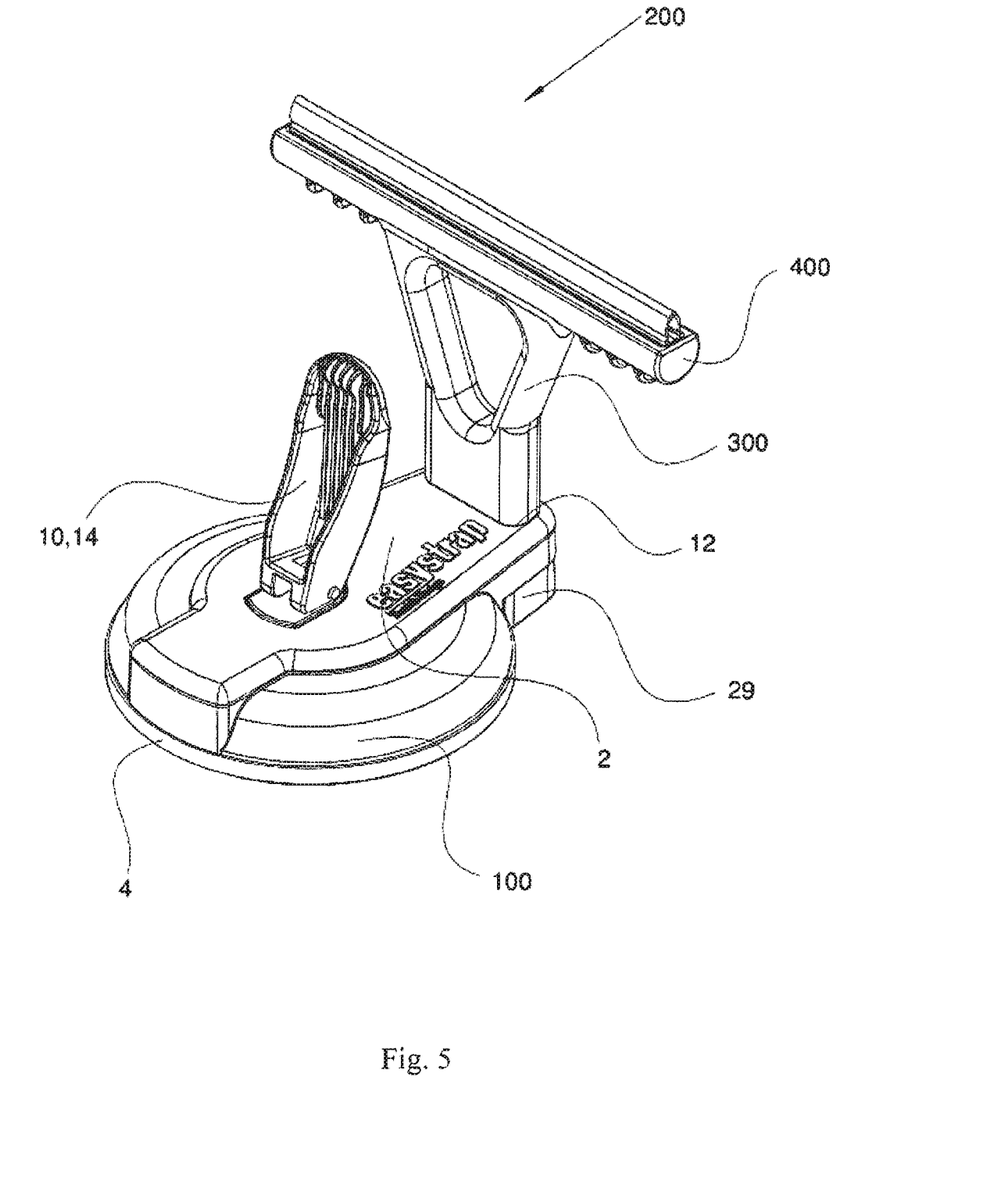
FIG. 5 shows in a perspective view one type of a system according to the second aspect of the present invention.

FIG. 5 shows a system according to the first aspect of the present invention. The system depicted in FIG. 5 comprises a device 100 as shown in FIGS. 2, 3 and 4 in combination with a bracket 300. The bracket 300 is releasable attached to the through going hole 12 in the upper housing 2 of the device 100. A fixation part 29 is mounted in the opposite side of the hole 12, compared to the side from which the bracket 300 is received. The fixation part 29 secures that the bracket will not accidentally and unintentionally be released during transport of goods.

On top of the bracket 300 is arranged a rail 400. The rail comprises an oblong element which is fixed to the bracket at its middle part. The rail serves the purpose of being a support for goods to be transported.

Figure 6A:
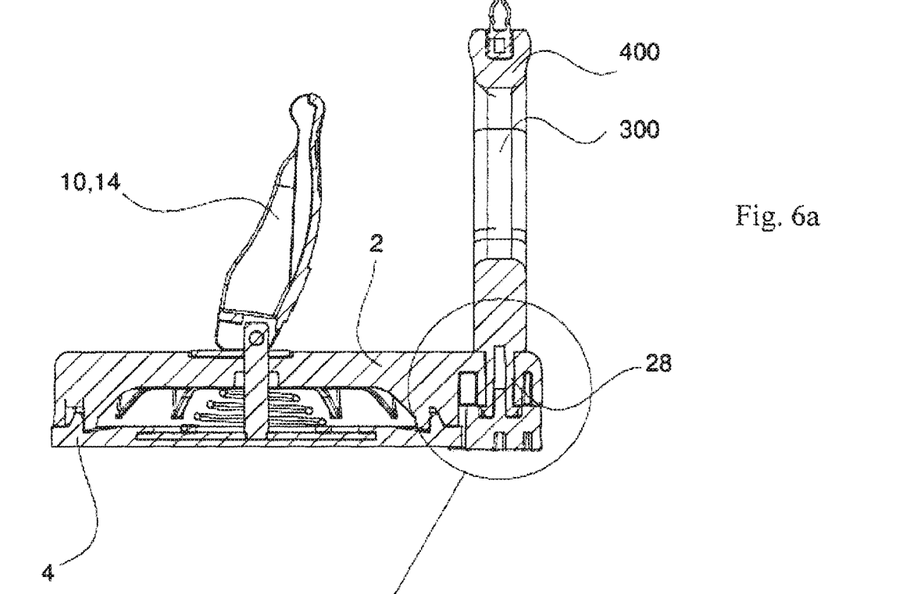
FIG. 6a shows in a cross-sectional view the system of FIG. 5.
Figure 6B:
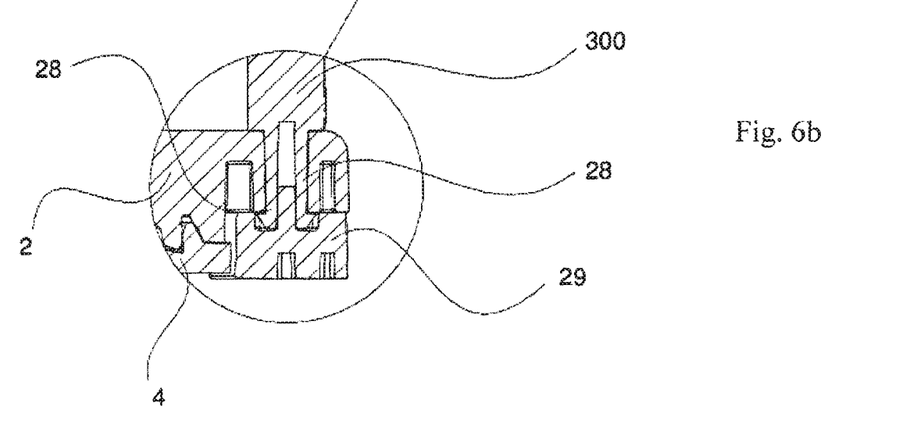

Details of the attachment means of the bracket 300 is show in FIG. 6a and in a close-up view in FIG. 6b. These figures show that the attachment means 28 of the bracket 300 comprises two spaced-apart arms 28 arranged at the end of the bracket 300. The arms are flexible and may be bended against each other upon insertion into the hole 12 of the upper housing 2 of the device 100. Upon full insertion of these arms 28 the arms will lock themselves into a locked position by engaging against the material of the upper housing defining the edge of the hole 12. A fixation part 29 is subsequently inserted into the hole 12 from the below, opposite side of the hole. This ensures that the two arms 28 cannot be bended and thus secures that the bracket 300 will not be unintentionally released.

Although the invention has been described with reference to only a few embodiments it is to be understood that the invention comprises several other embodiments, which are all within the scope of the present invention.

LIST OF REFERENCE NUMERALS

2 Upper housing of device of the system according to the first aspect of the invention
4 Bottom part of device of the system according to the first aspect of the invention
6 Bottom surface of bottom part of device of the system
8 Top surface of bottom part of device of the system
10 Actuator means of device of the system
12 Through going hole of upper part of device of the system
14 Lever of actuator means
16 First end of lever
18 Second end of lever
20 Actuation rod
22 Relatively stiff sheet material
24 Lock of device of the system
26 Spring for spring loading lever
28 Attachment means
29 Fixation part
100 Device of system according to the first aspect of the invention
200 System according to the first aspect of the invention
300 Bracket of system according to the first aspect of the invention
400 Rail to accompany bracket
500 One type of a prior art roof rack for a vehicle
600 Another type of a prior art roof rack for a vehicle

The invention claimed is:

1. A system (200) for mounting items to a surface of a vehicle body, the system comprising one or more devices (100) configured to secure one or more brackets (300) including an elongate rail (400) to which the items are mounted; each device when in an orientation intended for use including:
   an upper housing (2) made of a relatively hard material, the upper housing having a first and a second end and a cavity located between the first and second ends, said ends having a different vertical height, the first end not overlapping the cavity and including at least one through-going hole (12);

a bottom part (4) made of a flexible, relatively soft material arranged coaxial to the cavity-and-configured to shift its configuration between a disengaged configuration, in which a bottom surface (6) of the bottom part (4) is planar, and an engaged configuration, in which the bottom surface is concave;

a spring (26) that is disposed between and in contact with a top surface (8) of the bottom part (4) and a bottom surface of the upper housing (2);

actuator means (10) located in the upper housing and extending at least partly into the cavity for actuating the bottom part between the disengaged and engaged configurations when in a released and locked state, respectively;

attachment means (28) at least partially received by the at least one through going hole and configured for releasably connecting a portion of the elongate rail to the at least one through-going hole; and a fixation part that engages the attachment means at a location below the upper housing for covering the attachment means to prevent unintentional disengagement;

wherein the attachment means (28) snap-fittingly interlocks with the bottom surface of the upper housing (2).

2. A system according to claim 1, wherein the surface area of the bottom surface (6) of the bottom part (4) of the device is selected from the group consisting of 75-700 $cm^2$, 100-675 $cm^2$, 125-650 $cm^2$, 150-625 $cm^2$, 175-600 $cm^2$, 200-575 $cm^2$, 225-550 $cm^2$, 250-525 $cm^2$, 275-500 $cm^2$, 300-475 $cm^2$, 325-450 $cm^2$, 350-425 $cm^2$, and 375-400 $cm^2$.

3. A system according to claim 1, wherein the upper housing (2) of the device is made from the group consisting of a polymer or polymer composite material, and a nylon mixed with other material(s).

4. A system according to claim 1, wherein the bottom part (4) of the device is made of a polymer.

5. A system according to claim 1, wherein said actuator means comprises a lever (14) having a first end (16) and a second end (18), said lever at a position near the first end being pivotally mounted in said upper housing and near the first end, being mechanically connected to an actuation rod (20) extending downwardly and being mechanically connected to the bottom part (4) of said device, said actuation rod being connected to a central part of the bottom part of said device.

6. A system according to claim 5, wherein an interior of said bottom part includes a sheet material (22); and said actuation rod being mechanically connected to said sheet material (22).

7. A system according to claim 1, wherein said device further comprising a lock (24) for locking against theft of said actuator means being configured to lock said actuator means (10) in the engaged configuration, in which the bottom surface of the bottom part is concave; and wherein said lock being configured for locking said actuator means (10) in the disengaged configuration.

8. A system according to claim 1, wherein said at least one through going holes provided in the upper housing of the device has a cross-sectional area selected from the group consisting of 1-30 $cm^2$, 2-28 $cm^2$, 4-26 $cm^2$, 6-24 $cm^2$, 8-22 $cm^2$, 10-20 $cm^2$, 12-18 $cm^2$ and 14-16 $cm^2$.

9. A system according to claim 1, wherein the attachment means (28) comprise(s) a snap on lock for releasably attaching to said at least one through going holes in said upper housing.

10. A system according to claim 1, wherein said system comprises two or more brackets (300).

11. A system according to claim 1, wherein said rail is a telescopic rail being adapted to shift its configuration between an extracted configuration and a contracted configuration.

* * * * *